Patented Oct. 31, 1950

2,528,306

UNITED STATES PATENT OFFICE 2,528,306

THENYLAMINES

Howard D. Hartough, Pitman, and Emil Koft, Jr., Woodbury Heights, N. J., assignors to Socony-Vacuum Oil Company, Incorporated, a corporation of New York.

No Drawing. Application April 21, 1948, Serial No. 22,495

9 Claims. (Cl. 260—329)

The present invention is related to the preparation of N-methyl amines from formaldimines and, more particularly, to the preparation of N-methyl thenylamines from thenylformaldimine.

In application for United States Letters Patent Serial No. 782,962 filed October 29, 1947 in the name of Howard D. Hartough the preparation of formaldimines was disclosed. Therein it was established that the formaldimines of substances capable of participating in the Mannich reaction can be prepared in a manner analogous to that employed in preparing the thenylformaldimines. F. F. Blicke has defined the compounds capable of participating in the Mannich reaction as having "at least one hydrogen atom of pronounced reactivity." It has now been found that when these formaldimines are reduced N-methyl amines are formed in accordance with the following equation where R is the residue of a thiophene compound:

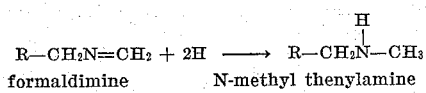

formaldimine     N-methyl thenylamine

The reduction can be carried out in any suitable manner, for example, by hydrogen produced by the reaction of zinc and hydrochloric acid or by hydrogen in the presence of a suitable catalyst.

When the reduction is carried out in the presence of formaldehyde the N,N-dimethylamine is obtained in accordance with the following equations: (R has the same significance as heretofore)

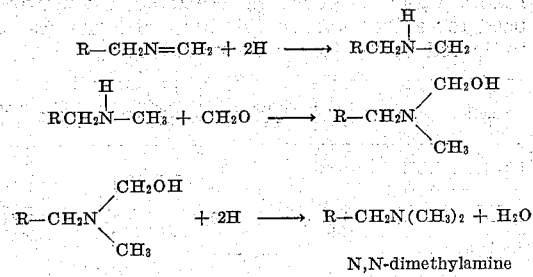

N,N-dimethylamine

Thiophene and alkyl thiophenes also are capable of entering into a reaction to form a compound having a structure corresponding to the formula, $H_2C=NCH_2R'CH_2N=CH_2$ (R' is a thiophene radical having two unsubstituted alpha positions) which likewise may be reduced in a similar manner to yield the di-(N,N-dimethylaminomethyl) derivative of the starting compound in accordance with the following equations:

$$H_2C=NCH_2R'CH_2N=CH_2 \xrightarrow{4H} H_3CNHCH_2R'CH_2NHCH_3$$

$H_3CNHCH_2R'CH_2NHCH_3 + 2CH_2O \longrightarrow$

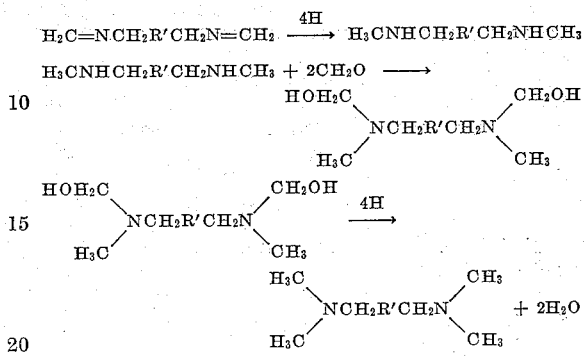

Thus, in general, the present invention provides for the reduction of thenylformaldimines either after separation from the reaction mixture in which the formaldimines have been prepared or, particularly when prepared in accordance with the method disclosed in copending application Serial No. 782,962, without separation from the reaction in which the formaldimines have been prepared. In the latter method particular advantage is taken of the fact that while the thenylformaldimines are relatively unstable, the reduction products are stable. For ease of description and illustration the preparation of the reduction products of the 2-thenylformaldimine will be described.

The preparation N-methyl-2-thenylamine can be carried out in a relatively easy manner. The N-(2-thenyl)formaldimine is prepared as described in copending application Serial No. 782,962 by mixing ammonium halide, aqueous formaldehyde and thiophene, heating the mixture to a temperature not exceeding 70° C. to initiate reaction, reducing the temperature to ambient temperatures, e. g., 10° to 20° C. separating an aqueous layer, neutralizing the aqueous layer and recovering the N-(2-thenyl)formaldimine set free by the neutralization.

Example I

The formaldimine so prepared is then reduced as follows: about 50 parts by weight of N-(2-thenyl)formaldimine (0.4 mole), about 200 parts by weight of water and about 40 parts by weight of zinc dust are mixed and warmed to about 45° C. while stirring vigorously. To the well-stirred and warmed mixture about 132 parts by weight of concentrated hydrochloric acid, i. e., and excess, diluted with about 150 parts by weight of water were added gradually. After the addition of the hydrochloric acid the temperature of the mixture was maintained in the range 83° to 102° C. for about seven hours, i. e., until substantially all of the zinc dissolved. The reaction mixture was cooled to room temperature, neutralized with aqueous 40 per cent sodium hydroxide and the zinc hydroxide filtered off. The filter was washed with benzene and the filtrate was extracted with benzene and the benzene extracts combined. The benzene was distilled from the extracts. The residue from the benzene extracts was distilled to yield the following fractions:

| Fraction No. | Temp., °C. | Pressure mm. of Hg | Parts by Weight | Refractive Index $n_D^{20}$ |
|---|---|---|---|---|
| IBP | 67 | 11 | | |
| 1 | 67 | 11 | 14 | 1.5371 |
| 2 | 123 | 1 | 1 | 1.5480 |
| 3 | 125 | 1 | 2 | 1.5743 |
| Residue | | | 4 | |

The phenylthiourea of fraction number 1 was prepared in the conventional manner and had a melting point of 127° to 128° C. A mixed melting point with an authentic sample of N-(2-thenyl) N-methyl-N'-phenylthiourea gave no depression establishing that fraction number 1 was N-methyl-2-thenylamine. Fraction number 3 was predominantly unreacted N-(2-thenyl)formaldimine.

*Example II*

N,N-dimethyl-2-thenylamine was prepared by reducing about 50 parts by weight of N-(2-thenyl)formaldimine in the presence of about 33 parts by weight of aqueous 36 per cent formaldehyde solution (about 0.4 mole) with about 40 parts by weight of zinc dust, 132 parts by weight of concentrated hydrochloric acid and about 350 parts by weight of water in the manner described in Example I. Distillation of the benzene extracts yield a product having a boiling point of 60° to 61° C. at a pressure of 10 millimeters of mercury and a refractive index of $n_D^{20}$ 1.5188. A crystalline methiodide of this compound was prepared and melted at 152.5° to 153° C. A methiodide of an authentic sample of N,N-dimethyl-2-thenylamine was prepared. The N,N-dimethyl-2-thenylamine was prepared by reacting methyl iodide with an authentic sample of N-methyl-2-thenylamine. No depression of the melting point of the methiodide of the authentic sample of N,N-dimethyl-2-thenylamine was observed when a mixed melting point of the methiodide of the authentic sample and the methiodide of the N,N-dimethyl-thenylamine prepared as described hereinbefore was determined.

*Example III*

About 168 parts by weight of thiophene (about 2 moles) and about 108 parts by weight of ammonium chloride (about 2 moles) were mixed. To the mixture so formed about 170 parts by weight of aqueous 36 per cent formaldehyde solution (about 2 moles) were added. The resultant mixture was warmed to about 65° C. and held at that temperature while adding an additional 170 parts by weight of aqueous 36 per cent formaldehyde solution. The reaction mixture was stirred vigorously until the temperature had dropped below 50° C. at which time about 200 parts by weight of zinc dust were added slowly while maintaining the temperature within the range 40° to 45° C. To this mixture were added slowly a mixture of about 305 parts by weight of concentrated hydrochloride acid in about 300 parts by weight of water. The mixture was stirred for about two hours at 35° to 45° C. and then warmed to 55° to 60° C. and held in that range for an additional three hours. Unreacted zinc was removed and the reaction mixture neutralized with aqueous 30 per cent sodium hydroxide solution. The zinc hydroxide was separated, washed and digested with benzene. The aqueous solution of the neutralized reaction mixture was extracted with benzene. The benzene solutions were combined, dried and the benzene removed. The residue was distilled under reduced pressure into fractions as indicated hereinafter.

| Fraction No. | Temp., °C. | Pressure mm. of Hg | Parts by Weight | Refractive Index $n_D^{20}$ |
|---|---|---|---|---|
| IBP | 60 | 10 | | |
| 1 | 65 | 10 | 34 | 1.5186 |
| 2 | 67 | 10 | 13 | 1.5190 |
| 3 | 135 | 5 | 20 | 1.5520 |
| 4 | 157 | 2.5 | 16 | 1.5783 |
| Residue | | | 30 | |

A methiodide was prepared from fraction number 1 in a conventional procedure. When recrystallized from ethanol the methiodide of fraction number 1 melted at 151.5° to 152° C.

| $C_8H_{14}INS$ | Nitrogen | Sulfur |
|---|---|---|
| Calculated | 4.95 | 11.32 |
| Found | 4.95 | 11.12 |

A mixture of this methiodide with an authentic sample of the methiodide of N,N-dimethyl-2-thenylamine melted without depression of the melting point of the authentic methiodide. Consequently, the primary constituent of fraction number 1 is

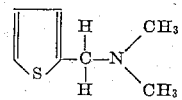

*Example IV*

The procedure described in Example III was repeated except that all of the formaldehyde was added at the beginning of the reaction and the reduction period was extended to about fifteen hours until all of the zinc dust had dissolved. The reaction product after evaporation of the benzene used for extraction was distilled with the results indicated in the following tabulation:

| Fraction No. | Temp., °C. | Pressure mm. of Hg | Parts by Weight | Refractive Index $n_D^{20}$ |
|---|---|---|---|---|
| IBP | 64 | 10 | | |
| 1 | 66 | 10 | 31 | 1.5183 |
| 2 | 115 | 10 | 3 | 1.5287 |
| 3 | ¹144 | 10 | 11 | 1.5453 |
| 4 | 144+ | 10 | 4 | 1.5607 |
| Residue | | | 5 | |

¹ Main boiling range 134° to 144°.

Fraction number 1 was essentially all N,N-dimethyl-2-thenylamine. A methiodide was prepared from fraction number 3 by reaction with methyl iodide in a conventional manner. The crystalline dimethiodide derivative after recrystallization from ethanol melted at 241° to 243° C. (uncorrected) with decomposition. The formula $C_{12}H_{24}I_2N_2S$ was established from the analysis.

| $C_{12}H_{24}I_2N_2S$ | Nitrogen | Sulfur | Carbon | Hydrogen |
|---|---|---|---|---|
| Calculated | 5.81 | 6.65 | 29.93 | 5.02 |
| Found | 5.84 | 6.89 | 29.87 | 5.59 |

It follows that the essential constituent of fraction number 3 is di-2,5-(N,N-dimethyl aminomethyl) thiophene corresponding to the formula

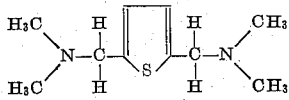

In a similar manner the corresponding derivatives of methyl thiophene and other alkyl thiophenes can be prepared. Thus, for example, 2-methylthiophene when reacted with ammonium halide and formaldehyde as described hereinbefore and the N-(5-methyl-2-thenyl)-formaldimine reduced either with zinc dust and hydrochloric acid or hydrogen in the presence of a hydrogenation catalyst such as nickel, platinum, cobalt molybdate and the like yields N-methyl-5-methyl-2-thenylamine. However, reduction of the formaldimine in the presence of formaldehyde either with zinc and hydrochloric acid or with hydrogen in the presence of a hydrogenation catalyst such as nickel, platinum or the like or cobalt molybdate or other hydrogenation catalysts which retain their activity in the presence of sulfur yields N,N-dimethyl-5-methyl-2-thenylamine. The formaldehyde may be present as unreacted formaldehyde when the formaldimine is not separated from the reaction mixture in which the formaldimine is obtained or may be formaldehyde which is added to the separated, substantially pure formaldimine. In general, the alkylthiophenes having the alkyl substituent in the 2- or 5-positions yield only the N,N-dimethyl derivatives. However, the alkyl thiophenes having the alkyl substituents in the 3 and/or 4 positions yield not only the N,N-dimethyl derivatives but also the alkyl derivatives of di-2,5-(N,N-dimethyl aminomethyl) thiophene. Consequently, in general the thenylamines and di-2,5-(N,N-dimethyl aminomethyl)-thiophenes corresponding to the formulae given hereinafter can be obtained:

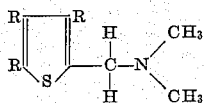

where R is hydrogen, an alkyl group, or a halogen and

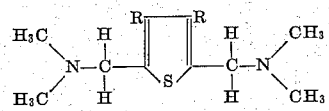

where R is hydrogen or an alkyl group, or a halogen.

The thenylamines described hereinbefore may be used as pharmaceuticals or as intermediates in the preparation of pharmaceutical products.

We claim:

1. Di-2,5-(N,N-dimethyl aminomethyl) thiophene.

2. Aminoethylthiophenes having a composition corresponding to the formula

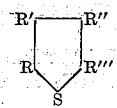

in which R is selected from the group consisting of hydrogen, an alkyl group, a halogen, aminoethyl, N-methylaminomethyl and N,N-dimethylaminomethyl; R' is selected from the group consisting of hydrogen, an alkyl group and a halogen; R'' is selected from the group consisting of hydrogen, an alkyl group and a halogen; and R''' is selected from the group consisting of aminomethyl, N-methylaminomethyl and N,N-dimethylaminomethyl.

3. 2-(N,N-dimethylaminomethyl) thiophene.

4. N-methyl-alpha-aminomethylthiophene.

5. Derivatives of 2-(N,N-dimethylaminomethyl) thiophene corresponding to the formula

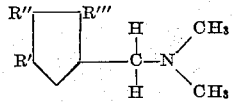

where R', R'' and R''' are alkyl groups, halogens and hydrogens and at least one of R', R'' and R''' is an alkyl group or a hydrogen.

6. Derivatives of 2,5-di-(N,N'-dimethyl) aminomethyl thiophene, corresponding to the formula

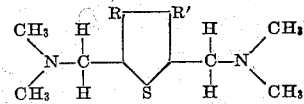

where R' and R'' are alkyl groups, halogens and hydrogens and at least one of R and R' is an alkyl group or a hydrogen.

7. A method for preparing hydrogenation products from N-2-thenylformaldimine, which comprises mixing thiophene and ammonium halide with an amount of formaldehyde in excess of one mole of formaldehyde, per mole of thiophene, to form a reaction mixture, heating said reaction mixture to about 65° C., cooling said reaction mixture to about 40-50° C., adding an amount of metallic zinc equal to at least 50% by weight of the thiophene, ammonium halide and formaldehyde whilst maintaining the reaction temperature within the range of about 40-45° C., adding sufficient dilute mineral acid to said reaction mixture to react with said zinc, warming said reaction mixture to about 55-60° C., maintaining said reaction mixture at about 55-60° C. until substantially all of said zinc is dissolved, neutralizing said reaction mixture, extracting said reaction mixture with benzene, and recovering hydrogenation products of said thenyl formaldimine.

8. A method for preparing alpha aminomethylthiophene, N-methyl- and (N,N'-dimethyl)-alpha-aminomethylthiophenes, which comprises hydrogenating N-(2-thenyl)formaldimine in the presence of formaldehyde at a temperature of about 55-60° C.

9. A method for preparing di-(N,N-dimethyl) aminomethylthiophene, which comprises hydrogenating a compound having a composition corresponding to the formula

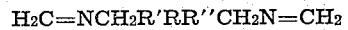

$H_2C=NCH_2R'RR''CH_2N=CH_2$ in the presence of formaldehyde at a temperature of about 55-60° C., R being a thiophene radical having two unsubstituted alpha positions R' and R" being substituents in the beta positions of R selected from the group consisting of hydrogen, halogen and alkyl.

HOWARD D. HARTOUGH.
EMIL KOFT, Jr.

REFERENCES CITED

The following references are of record in the file of this patent:

UNITED STATES PATENTS

| Number | Name | Date |
| --- | --- | --- |
| 2,500,822 | Hartough | Mar. 4, 1950 |

OTHER REFERENCES

Hartough, J. Am. Chem. Soc. 70, 1146–1149, 4013–4019 (1948).

Certificate of Correction

Patent No. 2,528,306                                                            October 31, 1950

HOWARD D. HARTOUGH ET AL.

It is hereby certified that error appears in the printed specification of the above numbered patent requiring correction as follows:

Column 1, lines 34 to 36, for that portion of the formula reading

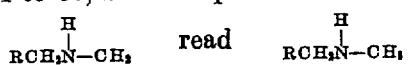

and that the said Letters Patent should be read as corrected above, so that the same may conform to the record of the case in the Patent Office.

Signed and sealed this 1st day of May, A. D. 1951.

[SEAL]

THOMAS F. MURPHY,
*Assistant Commissioner of Patents.*